US009532666B2

(12) United States Patent
Savage et al.

(10) Patent No.: US 9,532,666 B2
(45) Date of Patent: Jan. 3, 2017

(54) MODULAR STORAGE SYSTEM

(71) Applicants: Benjamin V. Savage, Loveland, OH (US); Craig S. Whitaker, Fairfield, OH (US)

(72) Inventors: Benjamin V. Savage, Loveland, OH (US); Craig S. Whitaker, Fairfield, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

(21) Appl. No.: 14/749,265

(22) Filed: Jun. 24, 2015

(65) Prior Publication Data

US 2015/0366377 A1 Dec. 24, 2015

Related U.S. Application Data

(60) Provisional application No. 62/016,213, filed on Jun. 24, 2014.

(51) Int. Cl.
*A47F 10/02* (2006.01)
*A47B 81/00* (2006.01)
*E05B 65/46* (2006.01)
*H02G 1/00* (2006.01)
*A47F 10/00* (2006.01)

(52) U.S. Cl.
CPC .............. *A47F 10/02* (2013.01); *A47B 81/00* (2013.01); *E05B 65/46* (2013.01); *H02G 1/00* (2013.01); *A47F 2010/005* (2013.01); *A47F 2010/025* (2013.01); *Y10T 29/49119* (2015.01)

(58) Field of Classification Search
CPC ............... A47F 10/02; A47F 2010/025; A47F 2010/005; A47F 1/00; A47F 1/035; A47F 1/04; A47F 1/06; A47F 1/065; A47F 3/02; A47F 3/001; A47F 3/06; A47F 3/063; A47F 2003/006; A47B 81/00; E05B 65/46; G07F 11/46; G07F 11/62; H05K 5/0247; H05K 7/02; H05K 7/1417; H05K 7/1491; G02B 6/4459; H04Q 1/06
USPC ........................................ 700/237, 240, 242
See application file for complete search history.

(56) References Cited

U.S. PATENT DOCUMENTS

| 3,346,775 | A | * | 10/1967 | Christiansen | ........ | H05K 1/0286 361/729 |
| 5,042,972 | A | * | 8/1991 | Bach | .................... | A63H 33/042 446/175 |
| 5,745,366 | A | * | 4/1998 | Higham | .............. | G07F 17/0092 312/215 |
| 6,184,474 | B1 | * | 2/2001 | Craft, Jr. | .............. | H05K 5/0247 174/135 |

(Continued)

*Primary Examiner* — Andrew Roersma
(74) *Attorney, Agent, or Firm* — Thompson Hine LLP

(57) ABSTRACT

A storage system including a panel having a surface, and a storage component or partition configured to be releasably attached to the panel and supported on the surface to at least partially define a cavity. The system also includes a sensor configured to sense at least one of a removal, placement, presence or absence of an item in the cavity. The system further includes a wire configured to be operatively coupled to the sensor. The panel is configured to receive the wire such that the wire extends along a same side of the panel as the storage component or partition and is recessed relative to the surface.

30 Claims, 13 Drawing Sheets

(56) References Cited

U.S. PATENT DOCUMENTS

| | | | | |
|---|---|---|---|---|
| 7,028,852 B2* | 4/2006 | Johnson | A47F 1/126 | 108/60 |
| 7,142,944 B2* | 11/2006 | Holmes | A47B 88/00 | 221/4 |
| 7,144,255 B2* | 12/2006 | Seymour | H01R 13/627 | 434/118 |
| 7,630,789 B2* | 12/2009 | Broadfield | A61G 12/001 | 221/98 |
| 7,806,488 B2* | 10/2010 | Hannan | A47B 88/20 | 312/209 |
| 8,175,746 B2* | 5/2012 | Godlewski | A61J 7/0069 | 700/236 |
| 8,214,077 B2* | 7/2012 | Bertrand | A61J 7/0481 | 221/2 |
| 2003/0201697 A1* | 10/2003 | Richardson | A47B 81/00 | 312/209 |
| 2003/0222548 A1* | 12/2003 | Richardson | A47B 81/00 | 312/209 |
| 2005/0103545 A1* | 5/2005 | Green | B60L 5/005 | 180/168 |
| 2011/0101018 A1* | 5/2011 | Shafir | A47F 1/00 | 221/1 |
| 2011/0180440 A1* | 7/2011 | Weber | G07F 11/62 | 206/459.1 |
| 2012/0004764 A1* | 1/2012 | Rahilly | G06F 19/3462 | 700/225 |
| 2012/0187807 A1* | 7/2012 | Weber | A47B 88/20 | 312/29 |
| 2012/0191241 A1* | 7/2012 | Rahilly | G07G 1/0027 | 700/231 |
| 2012/0200385 A1* | 8/2012 | Savage | B25H 3/00 | 340/5.7 |
| 2012/0230015 A1* | 9/2012 | Zhu | F25D 27/00 | 362/94 |
| 2013/0030566 A1* | 1/2013 | Shavelsky | A61J 7/04 | 700/244 |
| 2013/0082581 A1* | 4/2013 | Bufalini | A61B 19/0248 | 312/209 |

* cited by examiner

MODULAR STORAGE SYSTEM

This application claims priority to U.S. Provisional Patent Application Ser. No. 62/016,213, filed on Jun. 24, 2014, the entire contents of which are incorporated by reference herein.

The present invention is directed to a storage system, and more particularly, to a modular storage system for storing and dispensing loose items and the like.

BACKGROUND

Storage systems can be used in various settings, such as industrial workplaces, assembly operations, maintenance and repair operations, healthcare facilities, educational facilities, business offices, and other environments where it is desired to store supplies. Such systems may utilize a sensor or sensors to track the status of the supplies stored in the system. The sensor(s) may be connected to a wire to couple the sensor to a power supply and/or provide a communications link. However, many existing systems are fixed in configuration and therefore cannot be reconfigured as desired. In addition, many existing modular systems do not properly account for wire placement.

SUMMARY

In one embodiment the present invention is a modular storage system which can be configured as desired, and also accommodates wires connected to sensors. More particularly, in one embodiment the invention is a storage system including a panel having a surface, and a storage component or partition configured to be releasably attached to the panel and supported on the surface to at least partially define a cavity. The system also includes a sensor configured to sense at least one of a removal, placement, presence or absence of an item in the cavity. The panel is configured to receive the wire such that the wire extends along a same side of the panel as the storage component or partition and is recessed relative to the surface.

DETAILED DESCRIPTION

Figure 1:
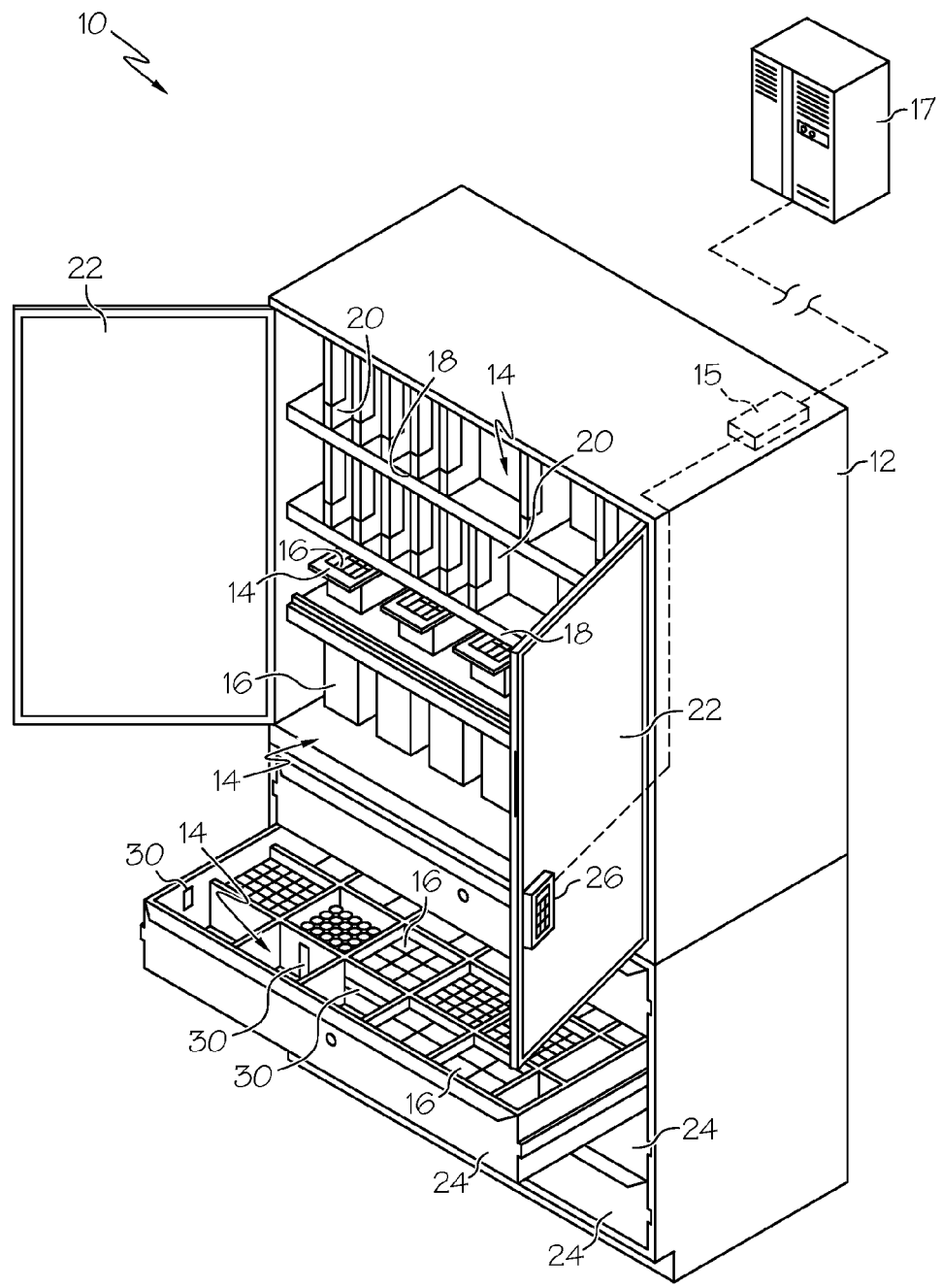
FIG. 1 is a front perspective view of one embodiment of a storage and dispensing cabinet.

FIG. 1 illustrates a system 10 including a dispensing cabinet 12 having various compartments 14 which can be selectively accessed by a user or users. The cabinet 12 can store one or a plurality of items, supplies, tools, components, parts, ingredients, kits, consumables, or the like 16 (collectively termed "items" herein) which can take any of a wide variety of forms, depending upon the industry and setting in which the system 10/cabinet 12 is utilized. In the embodiment of FIG. 1, the upper compartments 14 of the storage cabinet 12 are defined by a plurality of horizontally-extending shelves 18 and vertically-extending dividers 20. The front of the upper compartments 14 may be selectively covered by a pair of doors 22 which can be moved between the open positions shown in FIG. 1, and closed positions in which the doors 22 extend across and cover the upper compartments 14.

The storage cabinet 12 of FIG. 1 includes a plurality of sliding drawers 24 which can be opened (in some cases, only when authorized) to allow access to the associated compartments 14 and items 16 stored therein. Each drawer 24 may itself have internal covers, doors or panels (not shown) which control access to one or more discrete compartments 14 thereof, and/or whose opening and closing can be sensed and/or controlled. Further details of the dispensing system shown in FIG. 1, and other dispensing systems, are provided in U.S. patent application Ser. Nos. 13/314,768 and 13/314,778, both filed on Dec. 8, 2011 and both titled Direct Access Dispensing System. The entire contents of both applications are incorporated by reference herein.

The storage cabinet 12 can be configured to selectively control access to all or certain of its compartments 14 by allowing selective opening of the doors 22, drawers 24, and other similar components. In particular, the storage cabinet 12 may have or be associated with a controller 15 which a user can interact with to gain access to all or certain of the compartments 14 of the storage cabinet 12. The controller 15 may include or take the form of a processor, CPU, computer or the like, and may include or be coupled to a user interface 26 in the form of a keypad, touch screen, keyboard, mouse, track ball, audio input device, receiver or the like. FIG. 1 illustrates a user interface 26 in the form of a keypad mounted on a door 20. However, the user interface 26 can be located at any of a wide variety of positions. Moreover, in some cases the controller 15 and/or user interface 26 may be omitted from the storage cabinet 12.

When a user wishes to access and withdraw an item 16 from a storage compartment 14/storage cabinet 12, or replace/replenish an item 16, in some cases the user may need to first be identified and/or authenticated. The identification/authentication steps can be carried out in a variety of manners and with various types of equipment, such as an identification system that may include or incorporate the controller 15 and/or user interface 26, or other components/equipment as described below. In one case, each user has a user identification and/or password, which may be unique to that user (or to a particular class of users). When prompted, the user can input the user ID and/or password into the user interface 26.

In another case, the system 10 can identify and/or authenticate the user by a key fob or other wireless device, that is carried by the user, which transmits in the radio frequency or at other frequencies, which transmission is received by the controller 15/user interface 26. In this case, a user may be automatically identified as he or she approaches the physical location of a storage cabinet 12. Alternatively, users can be authenticated through remote messaging to the controller 15 from an independent device or network, such as a smart phone, tablet, cell phone, mobile phone or device carried by the user. The user can also be identified and/or authenticated by any of a wide variety of other means or mechanisms, including by the use of a mechanical or electronic key, by swiping a card with a magnetic stripe, by biometrics, or combinations thereof. However, in some cases the user is not identified or required to be identified.

In cases where identification is utilized or required, once the user is identified the controller 15 may reference an authorization database included in and/or operatively coupled to the controller 15 and/or identification system. The authorization database can identify which of the plurality of compartments 14 and/or items 16 a particular identified user is authorized to access.

As described in greater detail below, the storage compartments 14/storage cabinet 12 may include or incorporate one or more sensors 30 so that the identity and number of the items 16 removed or added by the user can be tracked. The controller 15 may check the inventory levels of each item 16 (via the sensors 30, in one case) in the dispensers and/or storage component(s)/cabinet(s) 12 before a user carries out any dispensing/replenishment activities. After the transaction is completed, or during dispensing, the controller 15 may update inventory levels by adjusting for any items 16 taken, removed or added during a transaction/session, as sensed or tracked via the sensors 30. In this manner, the number of items 16 taken, removed or added can be tracked based upon a transactional basis, and the inventory status of the system 10 can be monitored.

FIG. 1 illustrates a case in which the user has been granted access to the compartments 14 by the opened doors 22/drawer 24 which exposes the components/dispensers/storage compartments 14 therein and provides the user access to the items 16 stored therein. The user may then be able to access and remove (or replace/replenish) an item 16 stored in the associated storage compartment 14. After the user has accessed the desired components 14 and retrieved, replaced or replenished the desired items 16, the associated doors 22/drawers 24 and the like may be closed, either by the user or automatically. The storage cabinet 12 may then lock the associated doors 22/drawers 24 such that no further access is allowed, at least to those associated compartments 14, until the next transaction. In other cases, the doors 22/drawers are not locked and/or closed, and free access is provided.

During a dispensing or return transaction, the user's dispensing/return/access behaviors may be monitored and/or controlled/limited, in some cases, to limit the user's access to only authorized items 16 and/or compartments 14, according to the authorization database. If an unauthorized transaction occurs (or is attempted), the system 10 may note the occurrence and possibly send a notification to a system administrator, and in some other cases, a siren, buzzer or surveillance camera, which can be part of the system 10, and may be activated.

With reference to FIGS. 3-6, each drawer 24, shelf or other component can include or receive a storage component 28 (which can include or be the same as or similar to the compartments 14 described above) which can be releasably or permanently attachable to the drawer 24 or other components. In the illustrated embodiment each storage component 28 takes the form of a generally rectangular prism with an open top surface, defining an inner cavity 29. The system 10 can include a plurality of sensors 30, and each sensor 30 can be coupled to, positioned in, on, at, or adjacent to an associated storage component 28 such that the sensor 30 can detect the presence and/or absence of an item 16 in the storage component 28/cavity 29 and/or detect the placement of an item 16 into and/or removal of an item 16 from the storage component 28/cavity 29.

Each sensor 30 can take any of a wide variety of forms. In one case, the sensor 30 is a break beam sensor such that when an item 16 is positioned in or removed from the monitored storage component 28/cavity 29, the break beam is broken, triggering the sensor. In another case, the sensor 30 is a light/dark switch which detects the sufficient presence and/or absence of light. However, each of the sensors 30 can take any of a wide variety of forms, including but not limited to pressure or force sensors, weight sensors, optical or line-of-sight sensors, detectors based on mechanical forces, membrane switches/sensors, magnetic switches/sensors, light or electromagnetic radiation (visible, infrared or otherwise) sensors, contact sensors, photoelectric sensors, ultrasonic sensors, piezoelectric sensors, piezoresistive sensors, accelerometers, motion sensors, tilt sensors, proximity sensors, electric field sensors and other sensing devices. The sensor 30 for a component 28 can be positioned either in and/or outside of the associated cavity 29, or may be directly coupled to or spaced apart from the component 28, or can be coupled to the drawer 24 (one embodiment of which is shown in FIG. 5) or at other locations of the cabinet 12/system 10.

Figure 5:
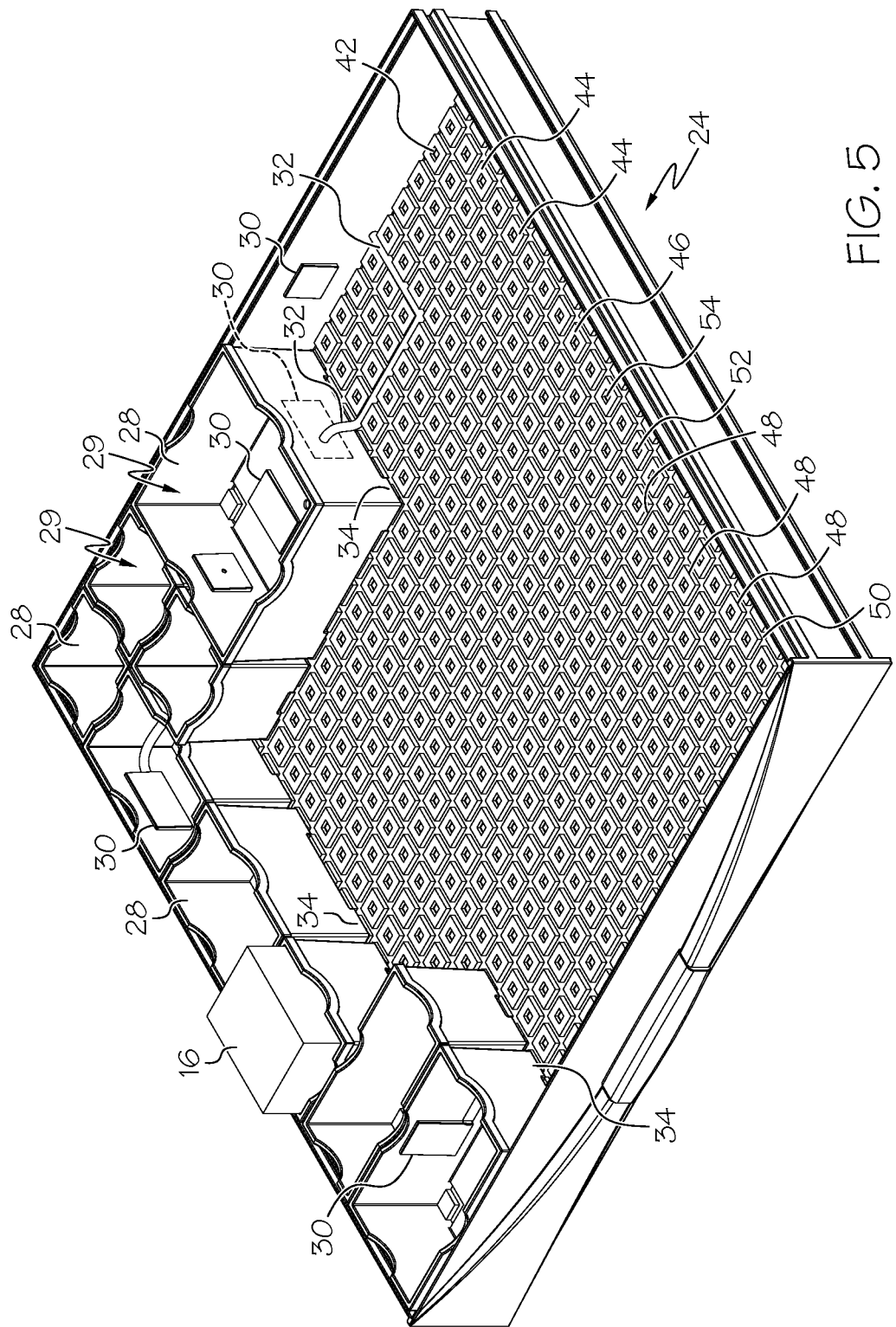
FIG. 5 is a top perspective view of a drawer with storage components coupled thereto.

In one case, each component 28/cavity 29 is sized to closely receive a single item 16 therein, as shown by item 16 in FIG. 5. Alternately, each component 28/cavity 29 is sized to receive multiple items therein, and/or bulk items such as liquids, powders, granular components, small components, etc. The corresponding sensors 30 can be configured to track one, multiple or bulk items. This capability enables the system 10 to accommodate a wide range of items having varying sizes and packages, ranging from items with a fixed and quantifiable dimensions and unit weight, to bulk materials which can otherwise be difficult to track. For example, a weight based sensor 30 can sense weight in the component 28/cavity 29 before and after user activity; a sensor 30 utilizing a biased or spring-loaded pusher bar which engages the items 16 can track the position of the pusher bar; and position sensors 30 such as mechanical or optical encoders, light or ultrasonic sensors, potentiometers, or mechanical linkages, level sensors can also be utilized.

Figure 3:
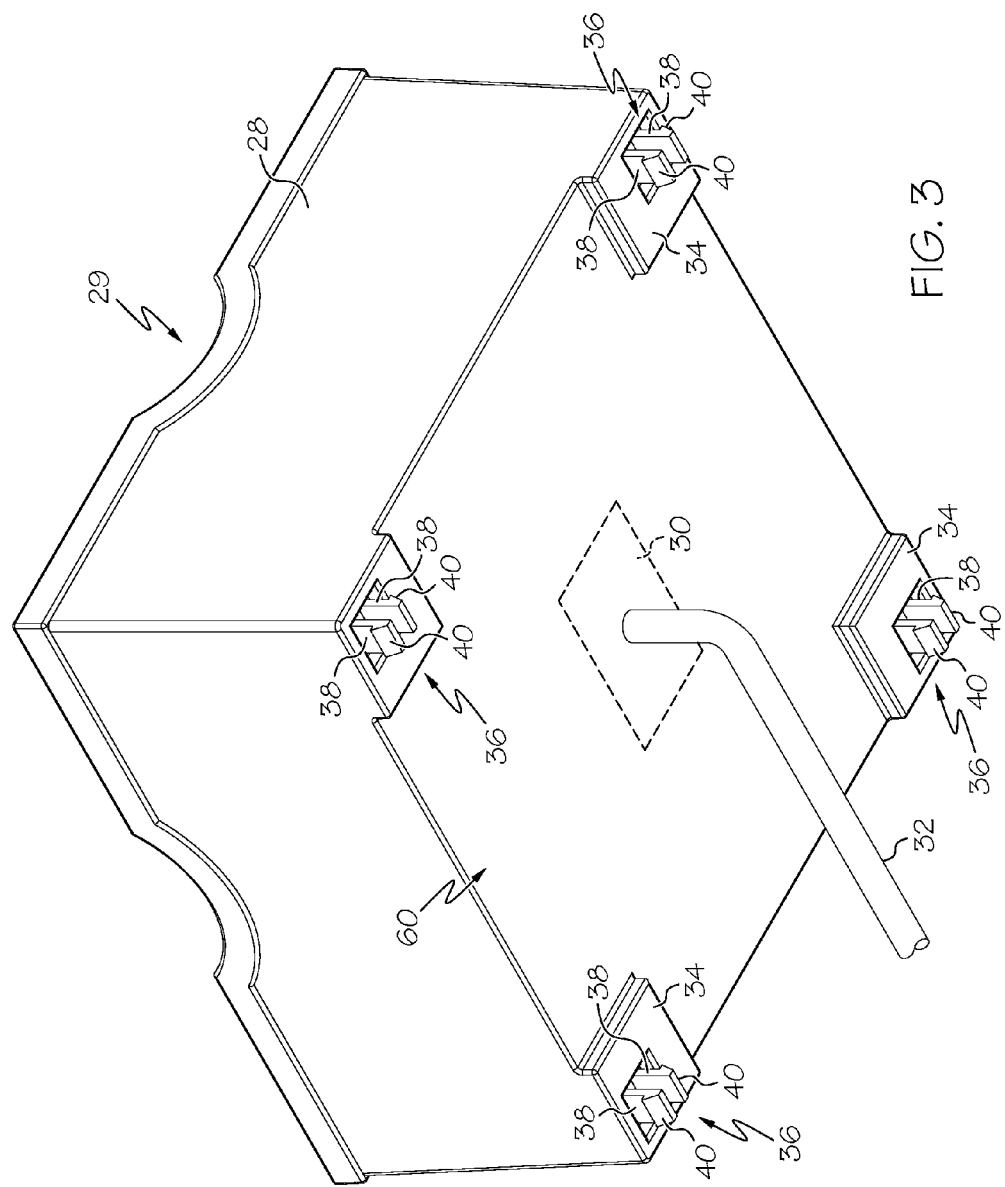
FIG. 3 is a bottom perspective view of a storage component.

Each sensor 30 may be connected to a wire 32 to couple the sensor 30 to a power supply and/or provide a communications link. However, wires 32 can be coupled to the associated sensor 30 for other purposes, and in some cases more than one wire 32 can be coupled to each sensor 30. In one case, each wire 32 connects each sensor 30 to the controller 15 and/or to other sensors 30 and/or a power source. In the embodiment of FIG. 3, the sensor 30 is positioned on a bottom surface of the cavity 29, and the wire 32 is also coupled to/passes through a bottom surface of the component 28 and extends away therefrom. However, the sensor 30 and/or wire 32 can be coupled to other surfaces, such as on the inner and/or outer sides of the components 28, as shown, for example, in FIG. 6, or to the side of the drawer 24, as shown in one embodiment of FIG. 5, or at other positions on the drawer 24, cabinet 12 or system 10.

With reference to FIG. 3, each component 28 can include a set of feet or protrusions 34 that extend downwardly from a main body 33 thereof. In the illustrated embodiment, each foot 34 is positioned at or adjacent to a corner of the component 28, although the feet 34 can be positioned at other locations if desired. Each foot 34 can include a coupling component 36 thereon and extending generally downwardly therefrom. The coupling components 36 can take any of a variety of shapes and formats, but in the illustrated embodiment each coupling component 36 includes a pair of parallel, spaced apart arms 38, with each arm 38 having a barbed tip 40 and extending downwardly, away from the main body 33.

Figure 4:
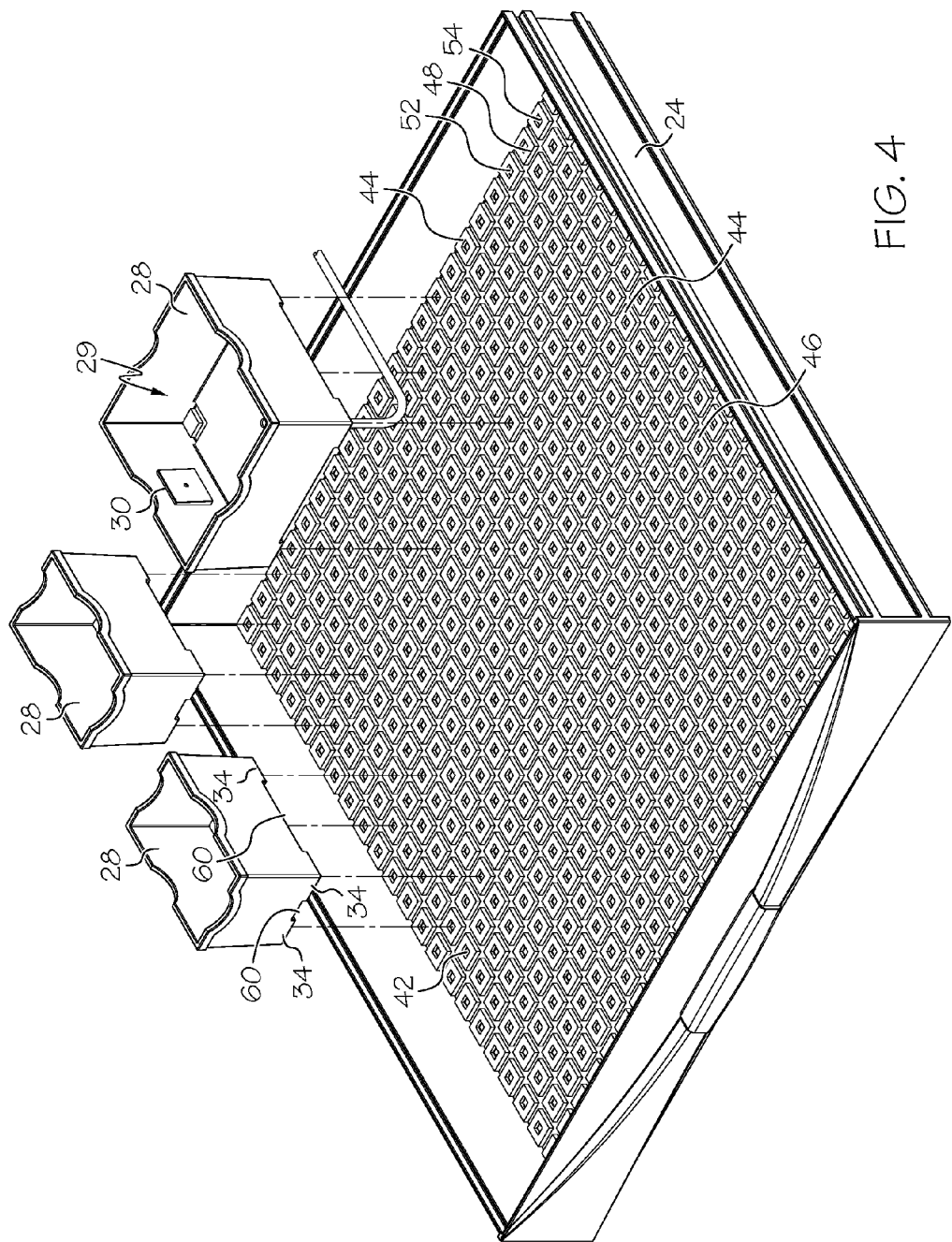
FIG. 4 is a top perspective view of a drawer, shown in conjunction with storage components exploded therefrom.
Figure 6:
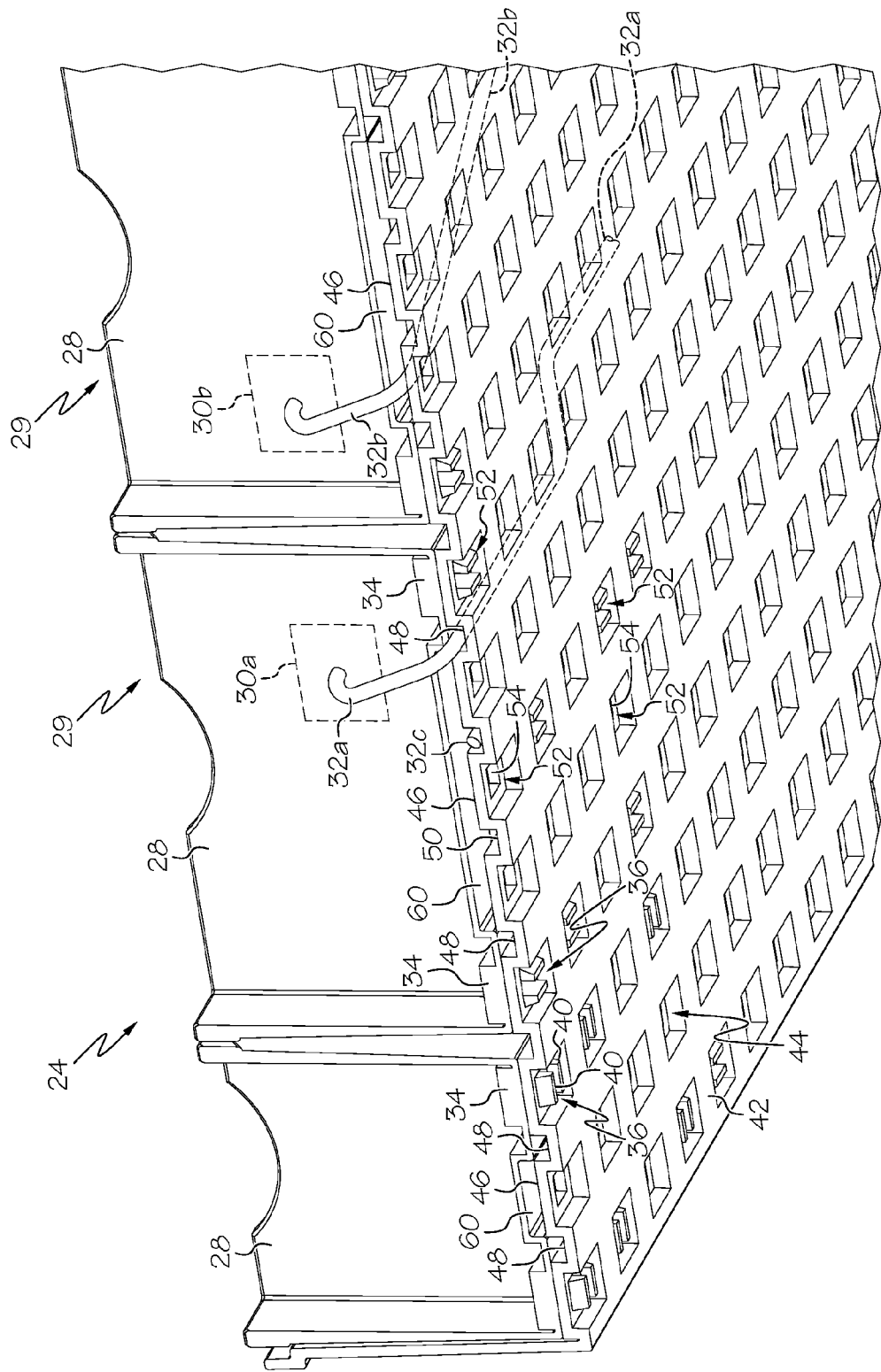
FIG. 6 is a bottom perspective view of a drawer and storage components coupled thereto, shown in cross section.

With reference to FIGS. 4-6, each drawer 24 may include, or be coupled to, a generally flat, planar panel 42. The illustrated panel 42 includes a plurality of regularly spaced, raised projections 44 formed thereon defining a generally flat, planar upper or outer surface 46 thereof. In the illustrated embodiment each projection 44 is generally square in top view, thereby defining a plurality of parallel and perpendicular, intersecting grooves 48 that extend around each projection 44.

With reference to FIG. 6, the grooves 48 define a lower surface 50 that is in one case generally parallel to the upper surface 46 but is recessed below or behind, and not co-planar with, the upper surface 46. Each projection 44 can be hollow, defining a recess or panel coupling component 52, the recesses 52 being arranged in an array. Each recess 52 has a relatively small mouth 54 at an upper end thereof, and a larger volume portion therebelow. In the illustrated embodiment each pair of projections 44 and each mouth 54 are square in top view, but the projections 44 and/or mouths 54 could have differing shapes.

The coupling component 36 of each component 28 is releasably attachable to/receivable in an associated projection 44/recess 52. In particular, each coupling component 36 can be positioned in the mouth 54 of one of the recesses 52 and urged downwardly into the mouth 54/recess 52, which (due to the angled shape of the barbed tips 40) causes the arms 38 of the coupling component 36 to be deflected toward each other and pass through the mouth 54. Once the coupling component 36 is inserted to a sufficient depth in the recess 52 (e.g. such that the barbed tips 40 reach the large volume portion of the recess 52), the arms 38 spring apart, locking the component 28 in place relative to the panel 42. The square/symmetrical nature of each mouth 54, recess 52 and coupling component 36 enables a coupling component 36 to be coupled thereto in four different positions, each rotated 90 degrees from the adjacent positions, which provides flexibility in the manner of connection, although as outlined above various other shapes and configurations could be utilized. The component 28 may be able to be uncoupled from the panel 42 by squeezing the arms 38 of the coupling components 36 together such that the coupling components 36 can be retracted through the associated mouths 54.

As can be seen in FIGS. 4 and 5 and noted above, the recesses 52 may be arranged in a regularly-spaced array. Each protrusion 34/coupling component 36 of a component 28 can thereby be spaced apart from each other by a distance corresponding to a whole number multiple of the distance between adjacent recesses 52 such that each coupling component 36 of a single component 28 can be simultaneously coupled to the panel 42/recesses 52 to lock the component 28 in place. It should be understood, however, that the configuration of the recesses 52 and arms 36 may be reversed such that the arms 36 are positioned on the panel 42, and the recesses 52 positioned on the components 28. In addition, it should be understood that the components 28 can be releasably coupled to the panel 42/drawer 24 by a wide variety of other coupling means or devices beyond the arm 40/recess 52 embodiment shown herein, such as hooks, latches, interlocking shapes and other mechanical fasteners, as well as hook-and-loop fastening material, magnets, etc.

Figure 7:
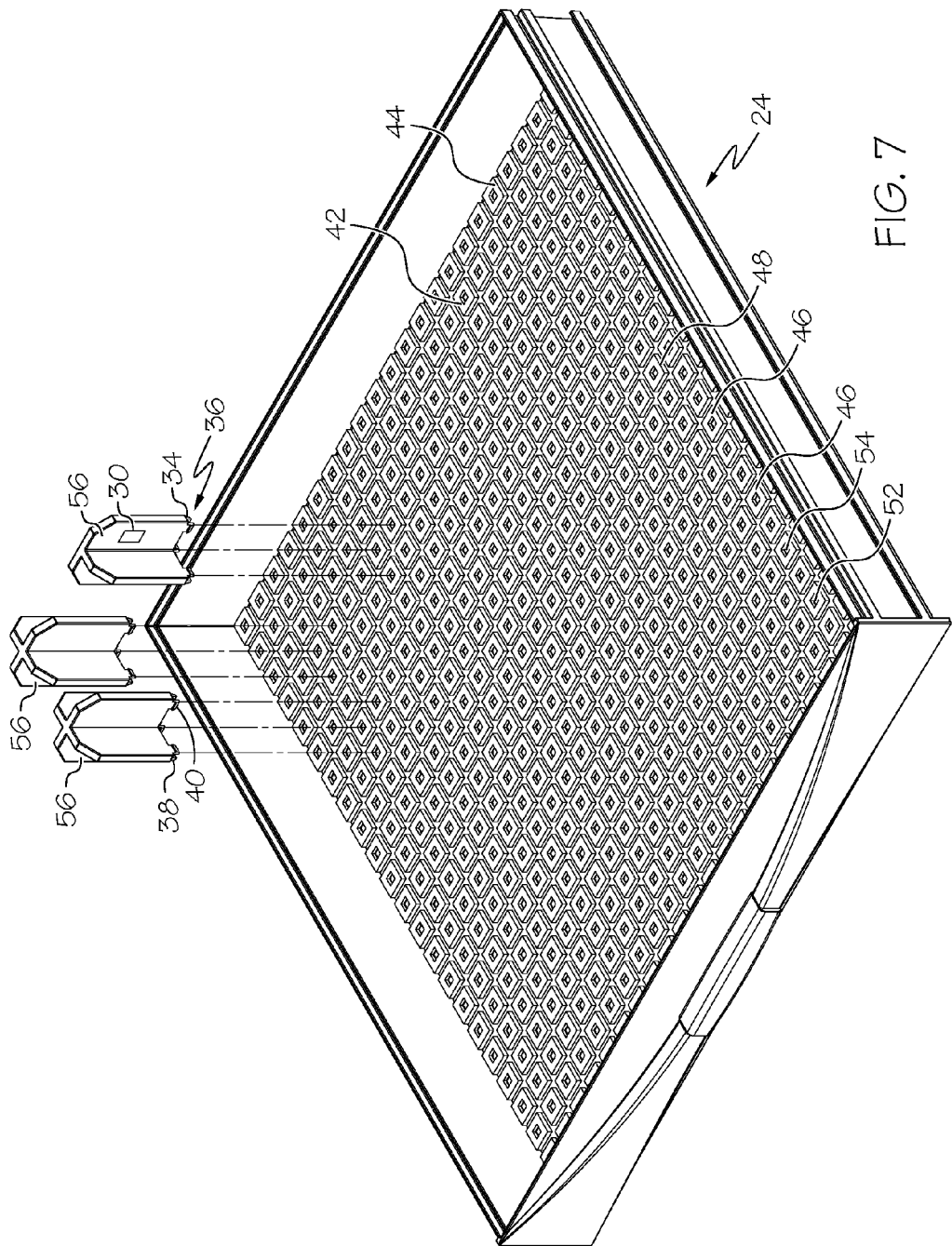
FIG. 7 is a top perspective view of a drawer, shown in conjunction with partitions exploded therefrom.
Figure 8:
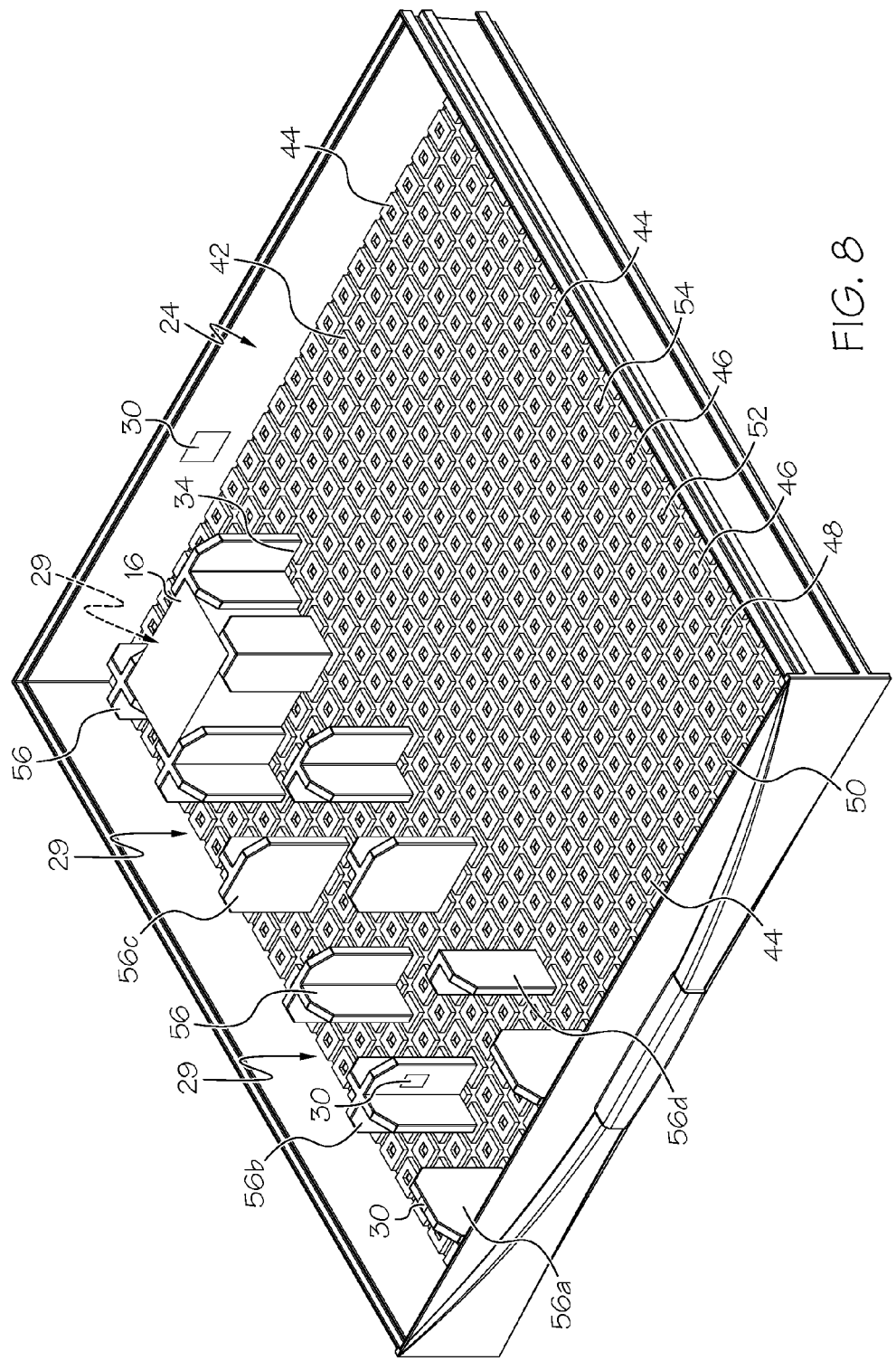
FIG. 8 is a top perspective view of a drawer with partitions coupled thereto.
Figure 9:
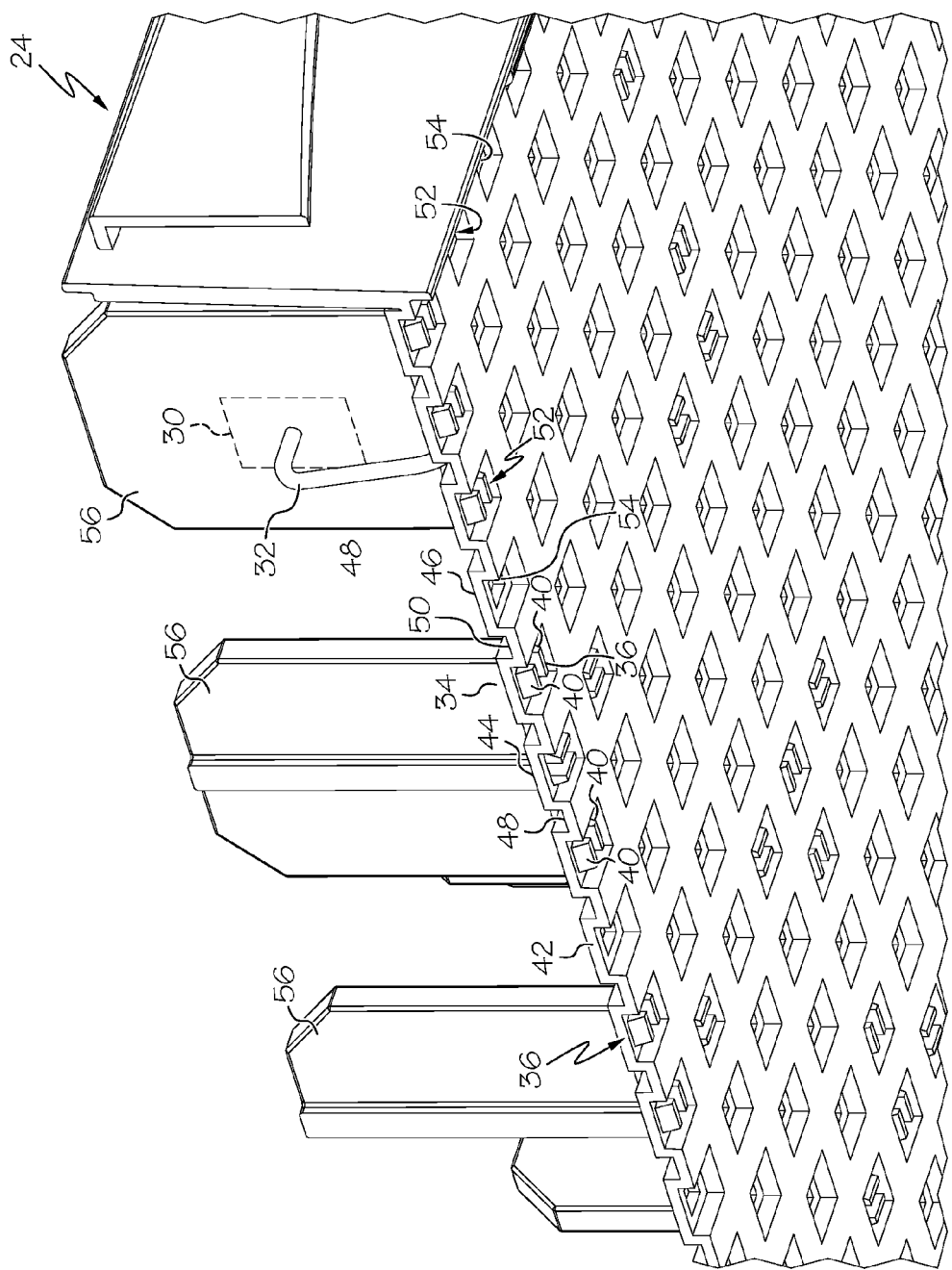
FIG. 9 is a bottom perspective view of a drawer and partitions coupled thereto, shown in cross section.
Figure 10:
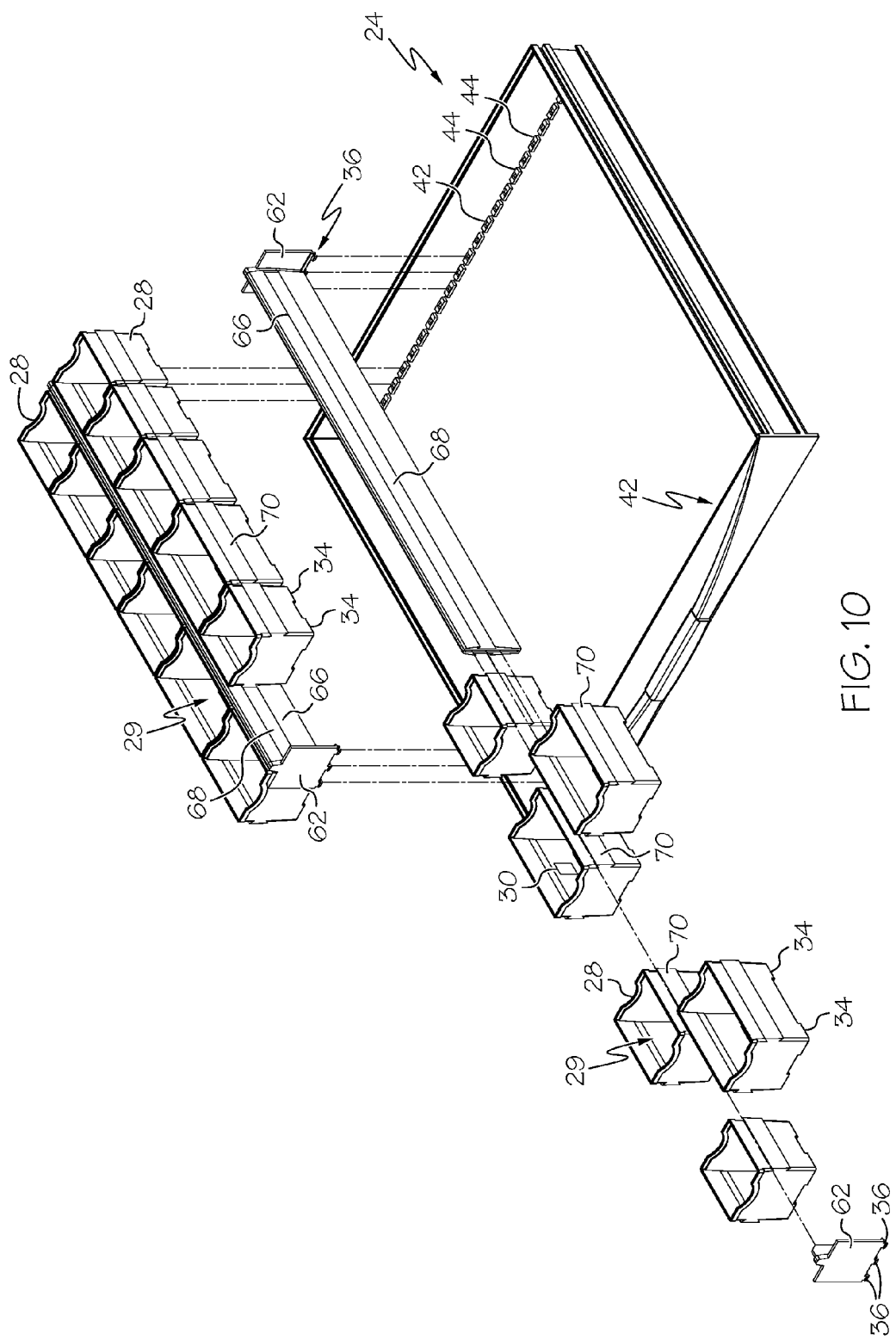
FIG. 10 is a top perspective view of a drawer, shown in conjunction with storage components and dividers exploded therefrom.

As shown in FIGS. 7-9, rather than using rectangular prisms as the components 28, one or more partitions 56 can be used to define the cavities 29. In this case, each partition 56 can include at least one generally flat, planar or angled wall or component, although the wall or components can be curved if desired. Multiple partitions 56 can then be utilized to form a cavity 29.

The partitions 56 can have any of a variety of shapes to provide the cavity 29 of the desired configuration. For example, with reference to FIG. 8 a partition 56 can have or take the form of only a single planar wall (see partition 56*a*) or multiple planar walls (see component 56*b* having a generally "x" shape in top view; component 56*c* having a generally "T" shape in top view, and component 56*d* having a generally "L" shape in top view). The partitions 56 can cooperate together, and/or with the outer walls of the drawer 24 or dividers placed therein, to define a cavity 29 that closely receives an item 16 therein, such as the item 16 shown in FIG. 8. One or more, or none, of the partitions 56 associated with a cavity 14 may include a sensor 30 as outlined above. Each partition 56 can include one or more feet/protrusion 34 in the same manner as the components 28 outlined above, although in another embodiment the partitions 56 lack the feet/protrusions 34.

As shown in FIG. 6, the grooves 48 in the panel 42 enable a wire 32 associated with one or more sensors 30 to be positioned therein. In particular, in the embodiment shown in FIG. 6, the sensor 30*a* is positioned internally of the cavity 29 of the component 28, and the associated wire 32*a* penetrates through the outer wall of the component 28 to operatively connect to the associated sensor 30*a*. Of course, various other configurations can be used to connect the wire 32*a* to the sensor 30*a*, such as by passing the wire 32 over the edge of the component 28, etc. In any case, a portion of the wire 32*a* that is positioned externally of the cavity 29 extends away from the component 28 and is positioned such that at least part of the wire 32*a* is entirely received in the associated groove 48, and entirely positioned below the upper surface 46 of the panel 42.

In this manner, the grooves 48 enable the wire 32 to be recessed below the upper surface 46 such that each component 28 or partition 56 can be coupled to the panel 42 in any manner desired, and the wire(s) 32 do not interfere with such placement. In the illustrated embodiment none of the feet 34, and no other part of the component 28/partition 56, is placed in any groove 48. In this manner the intersecting nature of the grooves 48 enables wires 32 to be routed in any manner to avoid other wires 32, or to be routed to the desired location, while remaining recessed and protected. The routed wires 32 can then exit the drawer 24 via, for example, the sides or bottom, to be connected to the controller 15, a power source, other wires or sensor, or other components. The wires 32 can be positioned on the same side of the panel 42 as the component 28/sensor 30 such that no through-holes or the like are required in the panel 42, and to provide ease of wire placement.

The feet 34 of each component 28/partition 56 (or adjacent components 28/partitions 56) form a pathway 60 between adjacent feet 34 and with the panel 42, as shown in FIG. 6. In particular, each foot 34 engages the upper surface 46 of the panel 42, and the main body 33 of each component 28/partition 56 remains raised and spaced apart from the panel 42 at a location of the storage component 28 or partition 56 which does not engage, and is spaced away from, the panel 42, forming or defining the pathway 60.

In some cases the wire 32 may be too large to fit into the grooves 48, or it otherwise may be desired to not place the wire 32 in the grooves 48. In this case, the wire 32 can fit underneath each component 28/partition 56, being positioned in a pathway 60. For example, FIG. 6 illustrates wire 32b, connected to sensor 30b, and positioned in a pathway 60. The pathways 60 provide a large number of path variations for the wires 32 and provide protection to the wires 32, as the wires 32 need not be aligned with a groove 48 and can extend at angles, in curved paths, etc. but in this case the wires 32 may need to be routed to avoid the feet 34. Thus the projections 34 serve the dual purpose of coupling the components 28 to the drawer 24/panel 42, and also providing the pathways 60. The pathway 60 can be sized to closely receive a wire 32 therein. In one case, for example, each pathway 60 has a height that greater than a height/diameter of the wire 32 but is within about 25% of the height/diameter of the wire 32, although each pathway 60 can have a height that is within about 50%, 100% or 200% of the height/diameter of the wire 32. This arrangement ensures sufficient clearance for the wire 32 without sacrificing undue space in the cavity 29. In some cases, as shown by wire 32c in FIG. 6, a wire 32 can be positioned in both a groove 48 and a pathway 60.

The grooves 48 and pathways 60 thereby enable the components 28/partitions 56 to be coupled to the panel 42/drawer 24 in a modular manner, and provide connections to the sensors 30, via the wires 32, while the wires 32 are routed as desired and protected. The numerous options provided by the grooves 48/pathways 60 ensure that the components 28/partitions 56 can be configured as desired in the most advantageous manner, while still ensuring robust and protected connections.

In the embodiments shown in FIGS. 3-9 the bottom surface of the drawer 24 is generally entirely covered with spaced projections 44. However, in an alternate embodiment none, or only part of the bottom surface of the drawer 24 is covered with projections 44. For example, in the embodiment shown in FIGS. 10-13, the panel 42 includes only two single rows of projections 44, each along an outer opposed edge thereof. In this case, the system 10 can utilize a pair of divider anchors 62, each of which includes one or more coupling components 36 such that each divider anchor 62 is releasably attachable to the drawer 24/projections 44 as shown in FIG. 12.

Figure 11:
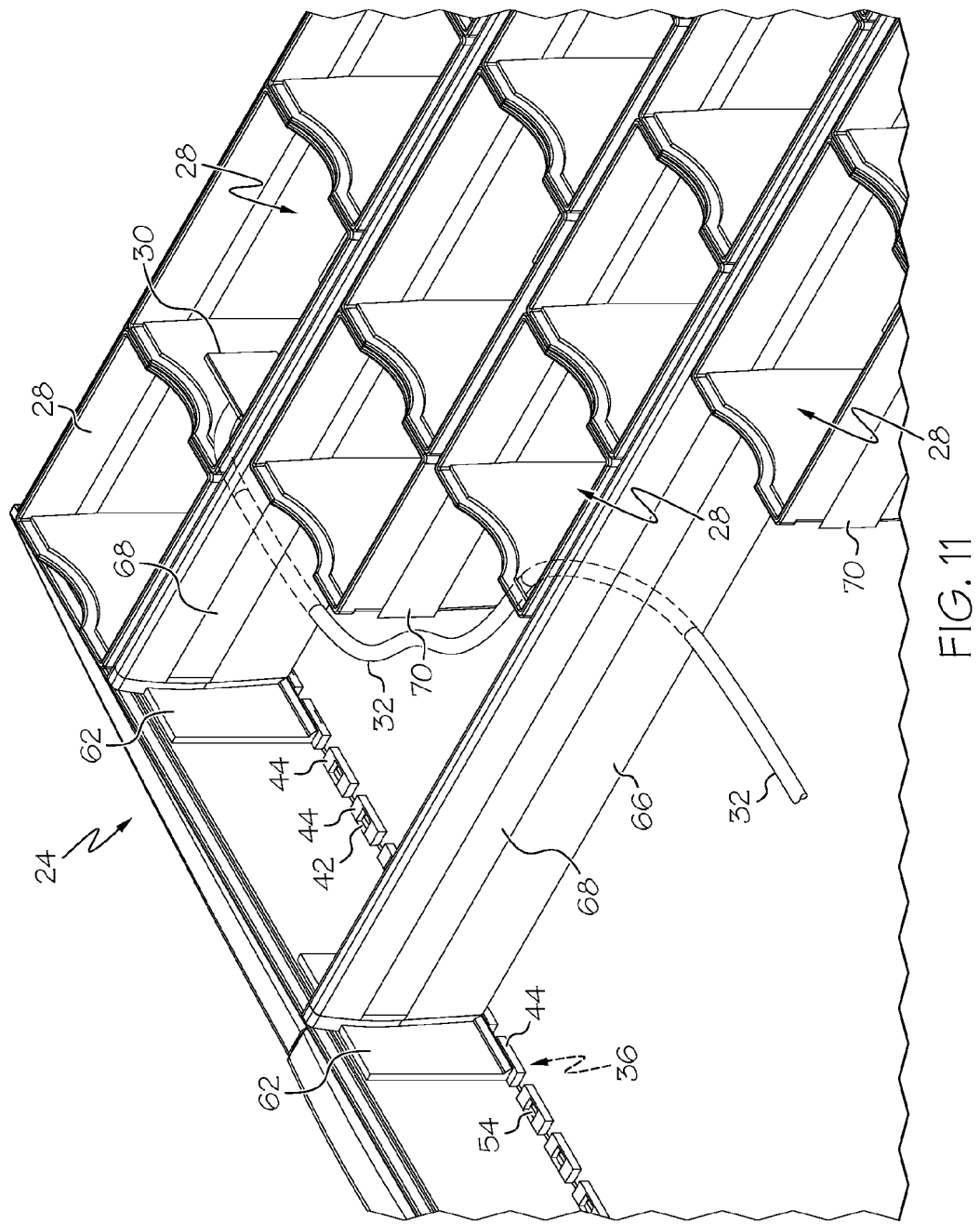
FIG. 11 is a top perspective view of a drawer with storage components and dividers coupled thereto.
Figure 12:
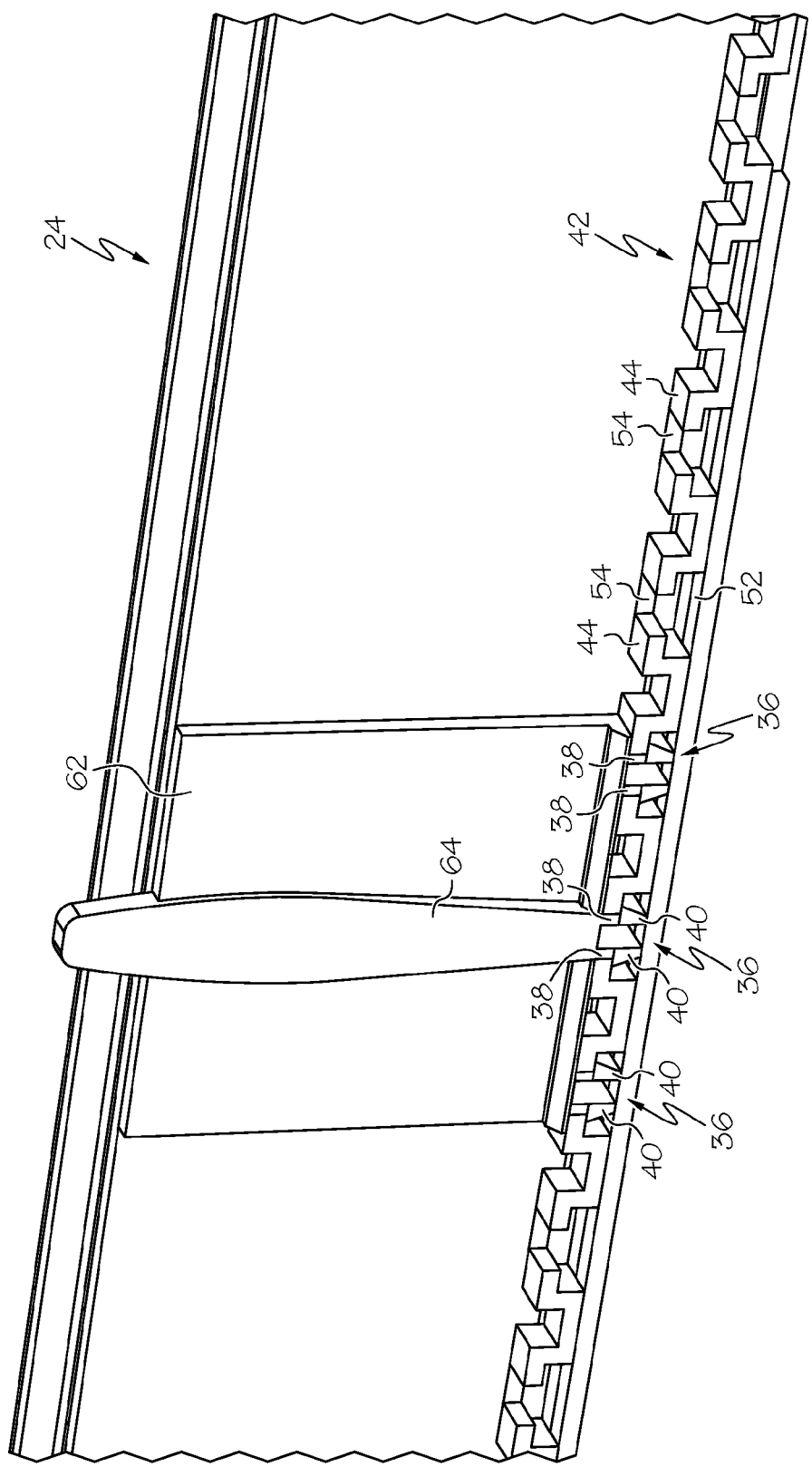
FIG. 12 is a front perspective view of a divider anchor coupled to a drawer, with the protrusions shown in cross section.
Figure 13:
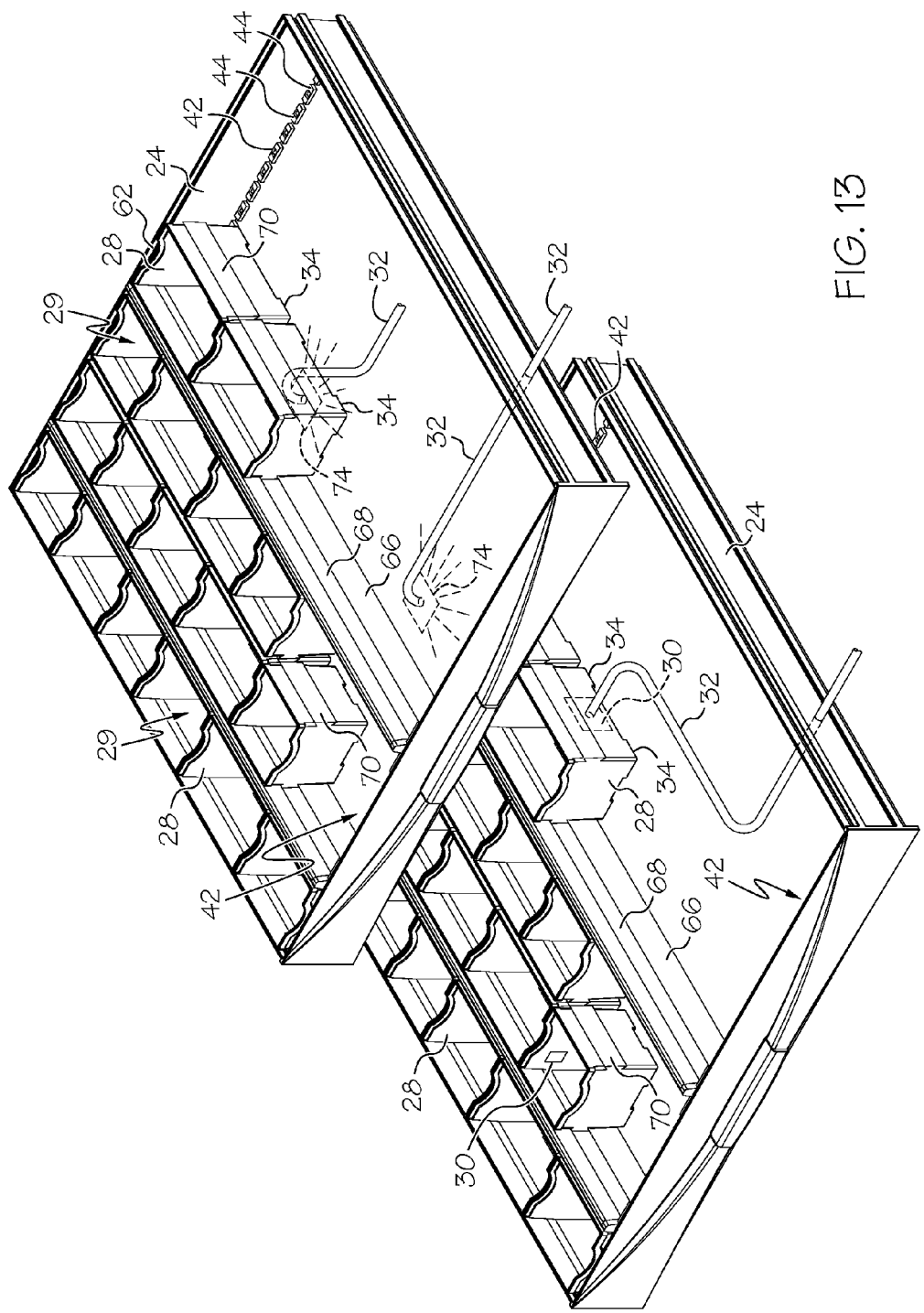
FIG. 13 is a front perspective view of two exploded drawers with storage components and dividers coupled thereto.

Each divider anchor 62 can include a vertically extending protrusion 64 (see FIG. 12). Each protrusion 64 is receivable in a corresponding recess at the end of a divider 66 to secure the divider 66 to the divider anchors 64. After the divider 66 is coupled to a divider anchor 64 at each end thereof, the divider anchors 64 can be releasably coupled to the drawer 24 by securing each coupling component 36 to an associated projection 44. When the divider 66 is positioned in place, the divider 66 can extend the entire lateral length and/or width of the drawer 24, between the rows of projections 44. Multiple dividers 66 can be coupled to the drawer 24 in this manner, if desired, as shown in FIGS. 11 and 13. Of course, the position of the protrusions 64 and recesses can be reversed such that the protrusions 64 are carried on the dividers 66 and the recesses are carried on the divider anchor 62, and other structure and/or mechanisms can be used to couple the divider anchors 62 and the dividers 66.

Each divider 66 can include a horizontally/longitudinally-extending groove 68 on each side thereof, and each component 28 can include a corresponding horizontally extending projection 70 on one or each side thereof that is slidably received in a groove 68 of the divider 66 to releasably attach each component 28 to an associated divider 66. Of course, each divider 66 can be coupled to the drawer 24 by a wide variety of means and mechanisms beyond those specifically shown and described herein, and each component 28 can be coupled to the dividers 66 in various manners beyond those specifically shown and described herein. In addition, the system 42 need not necessarily include any dividers 66, and each component 28 can be coupled to the drawer 24/panel 42 by other means. Each component 28 may also be able to be secured to adjacent components 28 in various manners, if desired.

Each component 28 may include the feet/projections 34 as outlined above, such that each component 28 defines the pathways 60 to enable the wires 32 to path under the components 28, providing the advantages outlined above, and as shown in FIGS. 11 and 13. In this embodiment, then, the projections 34 serve to provide the pathways 60 for wire placement and do not necessarily serve the additional purpose of securing the component 28 to the panel 28 for wire placement, although components 28 could be coupled to the outer rows of projections 44. Conversely, it should be understood that the panel 42 arrangement shown in FIGS. 3-8 can be used with components 28 that do not have the feet/protrusions 34, in which case pathways 60 are not provided and the wires 32 can be routed solely by the grooves 48.

The arrangements disclosed above can be used with multiple drawers in a stacked arrangement, as shown in FIGS. 1 and 13. Moreover, as shown in FIG. 13, an upper drawer 24 may have selectively actuatable lights 74 positioned on an underside thereof. The lights 74 can illuminate the drawer 24 position below when the lower drawer 24 is in an open or otherwise viewable or accessible position. In this manner, the lights 74 may be directed forwardly such that the lights illuminate the lower drawer 24 when the lower drawer 24 is in an open position while the upper drawer 24 remains in its closed position. The wire-routing features described above can be used to route wires 32 that supply power and/or control to the lights 74.

Figure 2:
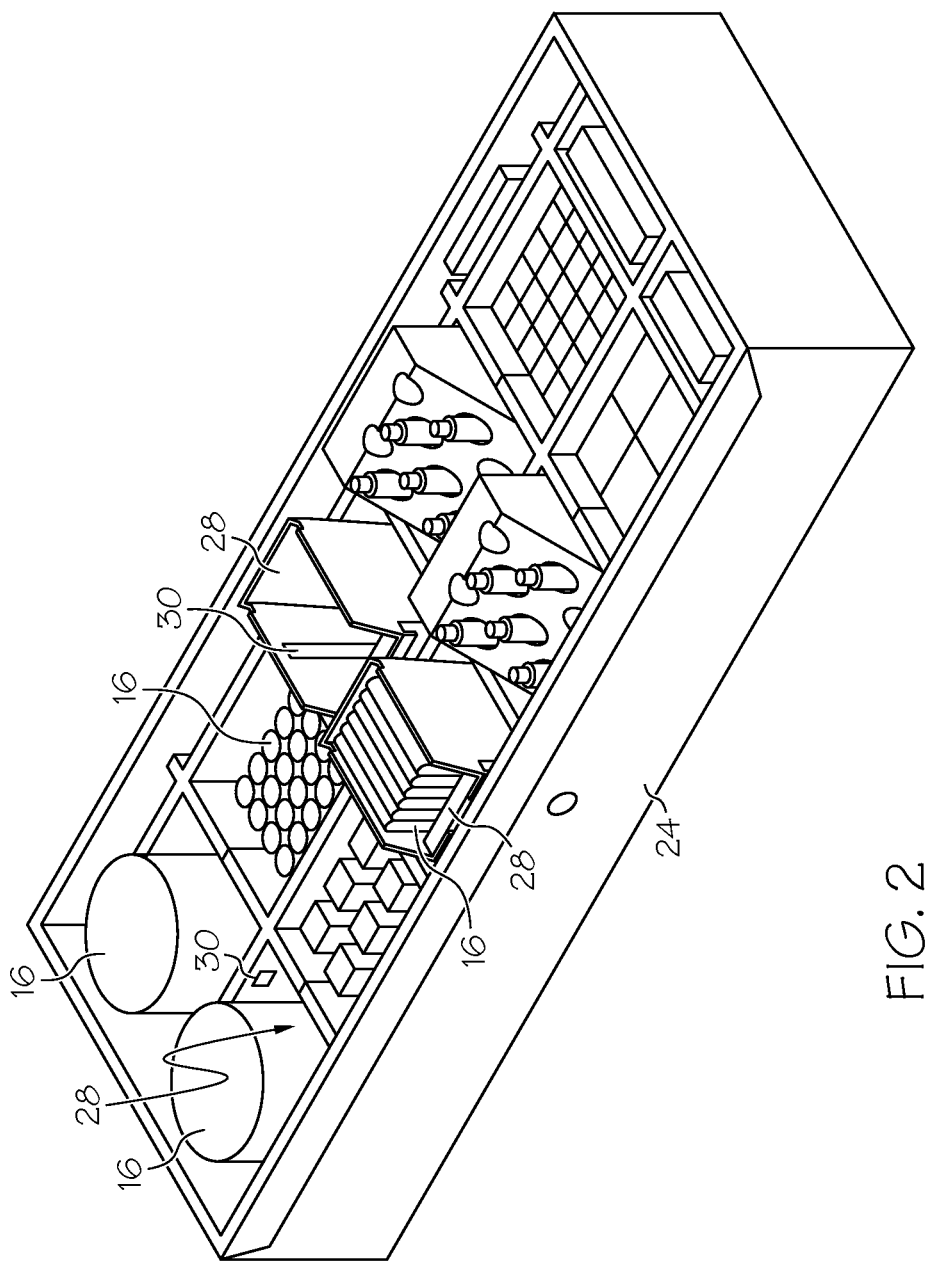
FIG. 2 is a front perspective view of a tray utilizing various display and storage components.

The description and drawings herein show the components 28, partitions 56, panel 42 and wire-routing features in conjunction with particular drawers 24 and/or for use with the storage cabinet 12. However it should be understood that the components 28, partitions 56, panel 42 and wire-routing features are not restricted for use with drawers 24 and/or the storage cabinet 12. For example, the components 28, partitions 56, panel 42 and wire-routing feature can also be used with a standalone, manually carryable drawer, as shown in FIG. 2, that is not fixedly coupled to a storage cabinet 12. The components 28, partitions 56, panel 42 and wire-routing features can be used on a fixed (non-slidable) shelf or drawer 24, or on various other systems, including those that do not identify users and/or restrict access and/or track dispensing. In addition, the system 10 can be configured and sized as desired to accommodate various different items 16 of varying sizes and shapes, providing scalability to the system 10.

Although the invention is shown and described with respect to certain embodiments, it should be clear that modifications will occur to those skilled in the art upon reading and understanding the specification, and the present invention includes all such modifications.

What is claimed is:

1. A storage system comprising:
a panel having a lower surface and a plurality of spaced projections extending from said lower surface, each of said spaced projections defining an upper surface and a corresponding recess recessed in said upper surface, wherein said lower surface defines a plurality of grooves between said spaced projections, said grooves extending generally parallel to said upper surfaces;
a storage component or partition configured to be releasably attached to more than two of said spaced projections of said panel and supported on the upper surfaces of said more than two said spaced projections to at least partially define a cavity, where said storage component or partition includes a plurality of coupling components that are releasable attached and received within said corresponding recesses of said more than two of said spaced projections of said panel;
a sensor configured to sense at least one of a removal, placement, presence or absence of an item in said cavity; and
a wire configured to be operatively coupled to said sensor, wherein said panel is configured to receive said wire such that said wire extends along a same side of said panel as said storage component or partition and is received in one of said plurality of grooves.

2. The system of claim 1 wherein said upper surface is a generally flat surface of said panel, and wherein said plurality of grooves extend generally parallel to the upper surfaces of the spaced projections but are recessed relative to the upper surfaces of the spaced projections.

3. The system of claim 2 wherein each of said plurality of grooves comprises said lower surface that is generally parallel to the upper surfaces of the spaced projections but not co-planar with the upper surfaces of the spaced projections.

4. The system of claim 1 wherein no part of said storage component or partition is received in any of said plurality of grooves.

5. The system of claim 2 wherein said one of said plurality of grooves closely receives said wire therein.

6. The system of claim 2 wherein at least part of said wire along a length thereof is entirely received in said one of said plurality of grooves such that no portion of said at least part of said wire protrudes from said one of said plurality of grooves.

7. The system of claim 1 wherein said coupling components comprise a protrusion, and wherein said protrusion is releasably receivable in one of the recesses in said upper surface of said spaced projections to releasably attach said storage component or partition to said panel.

8. The system of claim 7 wherein said panel includes a plurality of said recesses in said spaced projections arranged in an array, wherein said coupling components are each releasably selectively receivable in each of said recesses to provide flexibility in a location of said storage component or partition on said panel.

9. The system of claim 7 wherein said corresponding recesses in said spaced projections directly communicate with a first side of said panel, on which said storage component or partition is located, and directly communicate with a second, opposite side of said panel, on which said storage component or partition is not located.

10. The system of claim 1 further comprising a storage device including a drawer, and wherein said storage component or partition and said panel are positioned in said drawer.

11. The system of claim 10 wherein said drawer includes a light configured to illuminate a lower drawer positioned below said drawer.

12. The system of claim 1 wherein said sensor is at least one of a weight sensor, or a pressure sensor, or a force sensor, or a break beam sensor, or a light-dark sensor, or an optical sensor, or a line-of-sight sensor, or a membrane sensor, or a magnetic sensor, or a light sensor, or an electromagnetic radiation sensor, or a contact sensor, or a photoelectric sensor, or an ultrasonic sensor, or a piezoelectric sensor, or a piezoresistive sensor, or an accelerometer, or a motion sensor, or a tilt sensor, or a proximity sensor, or an electric field sensor, and wherein said sensor is operatively coupled to a processor via said wire such that said processor can identify removal of an item from said cavity.

13. The system of claim 1 wherein said storage component or partition is a generally rectangular prism defining said cavity.

14. The system of claim 1 wherein said storage component or is a partition having at least one generally planar surface, wherein said partition is configured to be attached to said panel such that said planar surface is generally perpendicular to said panel to at least partially define said cavity.

15. The system of claim 1 wherein said sensor is directly coupled to said storage component or partition and said wire is directly coupled to said sensor.

16. The system of claim 1 further comprising an identification system for identifying a user accessing or attempting to access an item positioned in said cavity, and wherein the system further comprises an authorization database operatively coupled to said identification system for tracking which of said items a particular identified user is authorized to access.

17. The system of claim 1 wherein said wire is operatively coupled to said sensor, said storage component or partition is releasably attached to said panel and supported on a plurality of said upper surfaces thereof, and wherein said wire extends along said panel on the same side as said storage component or partition and is recessed relative to said upper surface.

18. The system of claim 1 wherein said storage component or partition is configured to be releasably attached to said panel and define a pathway between said storage component or partition and said upper surfaces of said spaced projections, and wherein said wire is configured ID be positioned in said pathway.

19. A method for using a storage system comprising:
accessing a storage component or partition, wherein said storage component or partition includes a plurality of coupling components;
releasably attaching said storage component or partition to a plurality of spaced projections of a panel to at least partially define a cavity, wherein said panel includes a lower surface and said plurality of spaced projections extending from said lower surface, each of said spaced projections defining an upper surface and a corresponding recess recessed in said upper surface, wherein said lower surface defines a plurality of grooves between said spaced projections, said plurality of grooves extending generally parallel to the upper surfaces of said spaced projections and said storage component or partition releasably attached to more than two of said spaced projections, wherein said plurality of coupling components are releasably attached and received within said corresponding recesses of said more than two of said spaced projections, and wherein a sensor is configured to sense at least one of a removal, placement, presence or absence of an item in said cavity, and wherein a wire is operatively coupled to said sensor; and positioning said wire on said panel such that said wire extends along said panel on a same side as said storage component or partition and is received in one of said plurality of grooves.

20. A storage system comprising:

a panel having a lower surface and a plurality of spaced projections extending from said lower surface, each of said spaced projections defining an upper surface and a corresponding recess recessed in said upper surface, wherein said lower surface defines a plurality of grooves between said spaced projections;

a storage component or partition releasably attachable to more than two of said spaced projections of said panel to at least partially define a pathway between said storage component or partition and the upper surfaces of said more than two of said spaced projections, wherein said storage component or partition includes a plurality of coupling components that are releasably attached and received within said corresponding recesses of said more than two of said spaced projections of said panel;

a sensor configured to sense at least one of a removal, placement, presence or absence of an item in said cavity; and a wire configured to be operatively coupled to said sensor, wherein said wire is configured to be positioned in said pathway.

21. The system of claim 20 wherein said wire is configured to extend along a same side of said panel as said storage component or partition.

22. The system of claim 20 wherein said coupling components comprise at least one outwardly-extending protrusion which engages an equal number of said corresponding recesses of said more than two of said spaced projections to at least partially define said pathway.

23. The system of claim 22 wherein said at least one outwardly-extending protrusion releasably attaches said storage component or partition to said panel.

24. The system of claim 22 wherein said pathway is positioned adjacent to said at least one outwardly-extending protrusion at a location between said storage component or partition and said panel.

25. The system of claim 20 wherein said pathway has a height generally corresponding to a height or diameter of said wire.

26. The system of claim 20 wherein said panel includes a plurality of said recesses in said upper surfaces of said spaced projections arranged in an array, wherein said coupling components of said storage component or partition include a first and a second protrusion, wherein said first and second protrusions are configured to be simultaneously received in differing ones of said recesses to releasably attach said storage component or partition to said panel, and wherein said pathway is positioned between said first and second protrusions.

27. The system of claim 20 wherein said storage component or partition is directly releasably attachable to a divider which extends between a plurality of storage components or partitions, and wherein said divider is directly releasably attachable to said panel.

28. The system of claim 20 wherein said wire is operatively coupled to said sensor, and wherein said storage component or partition is releasably attached to said panel and defines said pathway therebetween, and wherein said wire is positioned in said pathway.

29. The system of claim 20 wherein said sensor is directly coupled to said storage component or partition.

30. A method for using a storage system comprising:

accessing a storage component or partition configured to at least partially define a cavity, wherein said storage component or partition includes a plurality of coupling components;

releasably attaching said storage component or partition to a panel to define a pathway therebetween and such that a sensor is configured to sense at least one of a removal, placement, presence or absence of an item in said cavity, wherein said panel includes a lower surface and a plurality of spaced projections extending from said lower surface, each of said spaced projections defining an upper surface and a corresponding recess recessed in said upper surface, wherein said lower surface defines a plurality of grooves between said spaced projections, and said storage component or partition is releasably attachable to more than two of said plurality of spaced projections of said panel, and said plurality of coupling components are releasably attached and received within said corresponding recesses of said more than two of said plurality of said spaced projections of said panel, and wherein a wire is operatively coupled to said sensor; and positioning said wire in said pathway, wherein said pathway extends between said storage component or partition and the upper surface of said more than two of said plurality of spaced projections.

* * * * *

UNITED STATES PATENT AND TRADEMARK OFFICE
CERTIFICATE OF CORRECTION

PATENT NO.         : 9,532,666 B2
APPLICATION NO.    : 14/749265
DATED              : January 3, 2017
INVENTOR(S)        : Benjamin V. Savage and Craig S. Whitaker It is certified that error appears in the above-identified patent and that said Letters Patent is hereby corrected as shown below:

In the Claims

Claim 7, Column 9, Line 54 reads:
"surface of said spaced projections to releasably attach said"
Should read:
-- surfaces of said spaced projections to releasably attach said --

Claim 14, Column 10, Lines 24-25 read:
"14. The system of claim 1 wherein said storage component or is a partition..."
Should read:
-- 14. The system of claim 1 wherein said storage component is a partition... --

Claim 18, Column 10, Lines 50-51 read:
"spaced projections, and wherein said wire is configured ID be positioned in said pathway."
Should read:
-- spaced projections, and wherein said wire is configured to be positioned in said pathway. --

Signed and Sealed this
Fourteenth Day of March, 2017

Michelle K. Lee
*Director of the United States Patent and Trademark Office*